US009891711B1

(12) United States Patent
Lee

(10) Patent No.: US 9,891,711 B1
(45) Date of Patent: Feb. 13, 2018

(54) HUMAN MACHINE INTERFACE WITH HAPTIC RESPONSE BASED ON PHASED ARRAY LIDAR

(71) Applicant: TOYOTA MOTOR ENGINEERING & MANUFACTURING NORTH AMERICA, INC., Erlander, KY (US)

(72) Inventor: Jae Seung Lee, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 16 days.

(21) Appl. No.: 15/219,966

(22) Filed: Jul. 26, 2016

(51) Int. Cl.
G06F 3/00 (2006.01)
G06F 3/01 (2006.01)
G06F 3/03 (2006.01)
G06K 9/00 (2006.01)
G06K 9/62 (2006.01)
G01S 17/58 (2006.01)

(52) U.S. Cl.
CPC .............. G06F 3/016 (2013.01); G01S 17/58 (2013.01); G06F 3/017 (2013.01); G06F 3/0325 (2013.01); G06K 9/00342 (2013.01); G06K 9/6202 (2013.01)

(58) Field of Classification Search
CPC ........ G06F 3/017; G06F 3/016; G06F 3/0325; G01S 17/58; G06K 9/6202; G06K 9/00342
See application file for complete search history.

(56) References Cited

U.S. PATENT DOCUMENTS

| 8,878,779 | B2 | 11/2014 | Givon et al. |
| 9,116,543 | B2 | 8/2015 | Wells |
| 9,239,650 | B2 | 1/2016 | Lee |
| 9,248,840 | B2 | 2/2016 | Truong |
| 2010/0271614 | A1* | 10/2010 | Albuquerque ........ G01S 7/4811 356/4.01 |
| 2012/0075255 | A1 | 3/2012 | Krah et al. |
| 2015/0022466 | A1 | 1/2015 | Levesque |
| 2015/0066294 | A1 | 3/2015 | Sivertsen |
| 2015/0169045 | A1 | 6/2015 | Yang |
| 2015/0169062 | A1 | 6/2015 | Park et al. |
| 2015/0186031 | A1 | 7/2015 | Mere et al. |

(Continued)

OTHER PUBLICATIONS

Jie Sun, et al., "Two-dimensional apodized silicon photonic phased arrays", Optics Letters, vol. 39, No. 2, Jan. 15, 2014, pp. 367-370.

(Continued)

Primary Examiner — Muhammad N Edun
(74) Attorney, Agent, or Firm — Oblon, McClelland, Maier & Neustadt, L.L.P.

(57) ABSTRACT

A device and a method for a human machine interface (HMI). The HMI device includes a dome having a hemispherical shape, a base attached to the dome forming an inverted cup like structure with a hollow interior, a chip scale lidar attached on the base and positioned to scan for a motion of an object external to the dome, at least one haptic device attached to the base and connected to the dome, and an HMI controller configured to send and receive signal from the chip scale lidar, detect and recognize a gesture based on the signal from the chip scale lidar, and activate or deactivate the at least one haptic device.

12 Claims, 5 Drawing Sheets

(56) References Cited

U.S. PATENT DOCUMENTS

| | | |
|---|---|---|
| 2016/0041618 A1 | 2/2016 | Poupyrev |
| 2016/0090103 A1 | 3/2016 | Tan |
| 2017/0217445 A1* | 8/2017 | Tzirkel-Hancock .. B60W 50/08 |

OTHER PUBLICATIONS

Michael R. Watts, "Chip Based LIDAR", Analog Photonics Proprietary, Jan. 3, 2016, 3 pages.

* cited by examiner

HUMAN MACHINE INTERFACE WITH HAPTIC RESPONSE BASED ON PHASED ARRAY LIDAR

BACKGROUND

Field of the Disclosure

This application relates generally to improvements in a human machine interface (HMI) with haptic response. More particularly, an HMI equipped with a phased array light detection and ranging (LIDAR) sensor or radar to detect gesture and a haptics to provide a feedback.

Description of the Related Art

Gesture detection and recognition technology enables touchless interaction with a human machine interface (HMI) and commands to perform a task to be issued from a distance. The technology involves software configured to identify human gestures particularly originating from a hand or face using camera and motion sensor inputs.

Commonly, a gesture based HMI control is equipped with a camera, or radar to capture a gesture and transmit the gesture to a vision or image processing software that can identify the type of gesture and a command associated with the gesture. Thus, based on the gesture, a particular command can be executed. The gesture recognition can also be used to analyze posture, gait, or human behavior.

Conventionally, the HMI based on gesture detection does not provide feedback to a user to indicate the command was received or processed as desired. Furthermore, a fast and complex gesture can take a while to process and may or may not accurately identify the gesture. As such, fast and accurate gesture detection with feedback is beneficial particularly in automotive applications where a driver is performing multiple tasks simultaneously and the feedback can be helpful or desired.

SUMMARY

According to an embodiment of the present disclosure, there is provided a human machine interface (HMI) device. The HMI device includes a dome having a hemispherical shape, a base attached to the dome forming an inverted cup like structure with a hollow interior, a chip scale lidar attached to the base and positioned to scan for a motion of an object external to the dome, at least one haptic device attached to the base and connected to the dome, and an HMI controller configured to send and receive a signal from the chip scale lidar, detect and recognize a gesture based on the signal from the chip scale lidar, and activate or deactivate the at least one haptic device.

Further, according to an embodiment of the present disclosure, there is provided a method for providing haptic feedback for a HMI device. The method includes receiving, using processing circuitry, a signal from a chip scale lidar sensor, determining, using the processing circuitry, a gesture based on the signal from the chip scale lidar sensor, determining, using the processing circuitry, whether the gesture is recognized, transmitting, via a network, a feedback signal to the haptic device, and executing a command corresponding to the gesture.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

Figure 1A:
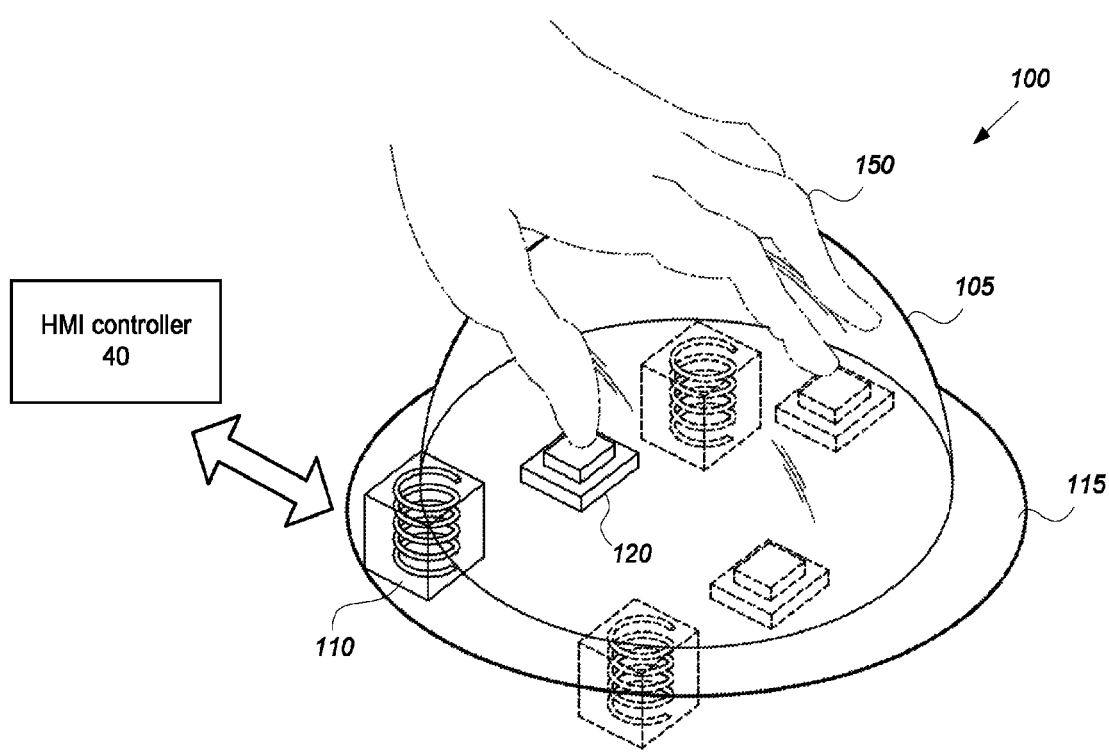
FIG. 1A illustrates a perspective view of a human machine interface device according to an exemplary embodiment of the present disclosure.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," and the like that may be used herein merely describe points of reference with respect to a figure, when the figure is held such that a figure caption is below the figure and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," and similar terms generally refer to ranges that include the identified value within a margin of 20%, 10% or preferably 5% in certain embodiments, and any values therebetween.

A light detection and ranging (LIDAR) sensor is a surveying technology that measures distance by illuminating a target with a laser light and calculating the time for the light signal to return. A conventional LIDAR sensor includes a mechanical scanning configuration for wide field-of-view that uses rotating mirrors driven by a motor. Such a configuration results in a bulky, slow and expensive LIDAR sensor. As such, use of conventional LIDAR sensor can be challenging in small sized HMI type applications that require fast object or gesture recognition.

FIG. 1A illustrates a perspective view of a human machine interface device according to an exemplary embodiment of the present disclosure. The human machine interface device 100 (HMI device 100 hereinafter) is a device that receives input from a user in the form of a gesture, identifies and executes a command corresponding to the gesture and provides haptic feedback to the user. The HMI device 100 can be implemented in a vehicle's control interface such as a radio controller, navigation controller, air condition (A/C) controller, transmission controller, etc. Alternatively or in addition, one or more control interfaces can be integrated into a single human machine interface and can be controlled using the HMI device 100. The vehicle can be an automobile, bus, truck, golf cart, train, aircraft, etc. A gesture involves a motion of a hand or face to indicate a command or state of being.

The HMI device 100 includes a dome 105, a haptic device 110, and a chip scale LIDAR 120. Furthermore, the HMI device 100 includes a HMI controller 40 that implements a pattern recognition algorithm to determine a type of gesture. The HMI controller 40 can send and receive a signal from the haptic device 110 and the chip scale LIDAR 120. In one embodiment of the present disclosure, the chip scale LIDAR 120 is installed on a base 115 of the HMI device 100 enclosed inside the dome 105. The dome 105 is connected to the haptic device 110, which can be placed below the base 115.

The chip scale LIDAR 120 (cLIDAR 120 hereinafter) is a high-speed, and low-power optical phased array. The optical phased array can be based on a phase shifting architecture. The approach utilizes approximately 32 μm long grating based antennas, fed through evanescent field waveguide couplers from a bus waveguide with directly integrated thermo-optic phase shifters. Several such cLIDARs can work together without interfering, an important feature for accident avoidance applications. The cLIDAR 120 can be fabricated in a CMOS compatible process that allows continuous, fast (more than 100 kHz), wide-angle (up to 51°) beam steering when the cLIDAR 120 is in a stationary state. The cLIDAR 120 has an extreme motion detection capability. The cLIDAR 120 can read a motion of a mirror block, where the mirror block is driven by a micro stepping motor. The cLIDAR 120 is capable of detecting motion at a high speed. For example, an experiment performed using cLIDAR 120 was able to detect motion at a speed up to 10 nm/s with the object at a distance from 5 inches, 9 inches and 13 inches away from the cLIDAR 120. Further, the cLIDAR 120 can detect fine motions of the finger. Compared to a phased array radar, which has a bandwidth of up to 8 GHz, the cLIDAR 120 bandwidth can be much higher, for example, more than 50 GHz. Such a high bandwidth allows very fine motion detection of less than a millimeter (also referred as sub-millimeter).

The cLIDAR 120 can be located on the base 115 with the field-of-view directed towards the dome 105. The cLIDAR 120 can be located on the base 115 at a center of the dome 105. Various exemplary locations where the cLIDAR 120 can be placed within the dome 105 are represented by the dotted outlines of the cLIDAR 120 in FIGS. 1A and 1B. The cLIDAR 120 can detect a gesture and send signal to the HMI controller 40 for the gesture recognition.

The HMI controller 40 can use a pattern recognition algorithm to determine the type of gesture. For example, the gesture can be related to a double click, a finger (e.g., index finger) rotation to the right or left, palm rotation, etc. The cLIDAR 120 can not only detect gestures performed on the surface of the dome 105, but also gestures originated within a certain distance from the surface of the dome 105. For example, gestures can be performed by moving a hand 150 or one or more fingers on the surface of the dome 105, or moving the hand 150 or one or more finger within a maximum allowable distance (e.g., up to 20%) away from the surface of the dome 105. The distance can be limited by the range of the cLIDAR 120, the size and shape of the dome 105. Alternatively or in addition, the HMI controller 40 can be configured to filter gestures within a pre-specified distance. The pre-specified distance can be based on experimentation and testing.

In another embodiment, the cLIDAR 120 can be located close to the periphery of the dome 105. Furthermore, a plurality of cLIDAR can be installed on the base 115 in a form of a rectangular array or in a circular manner. The plurality of cLIDAR can operate in a coordinated manner to detect a gesture performed by a user. The signals from the plurality of cLIDAR can be send to the HMI controller 40 to recognize the pattern of the gesture. For example, the pattern of the gesture can be a motion corresponding to actions such as a double click, a finger (e.g., index finger) rotation to the right or left, palm rotation, etc.

The dome 105 is a transparent cover that encloses the cLIDAR 120. The dome 105 is attached to the base 115 creating an inverted cup like structure with a hollow interior. The dome 105 can be made of transparent material that allows light to pass without scattering. The transparent material can be plastic or glass. The dome 105 can be of any shape (e.g., cubical with chamfered edges, oval, hemispherical, etc.) and size. External to the dome 105, a motion of the object such as the hand 150 or a finger can be detected by the cLIDAR 120.

Figure 1B:
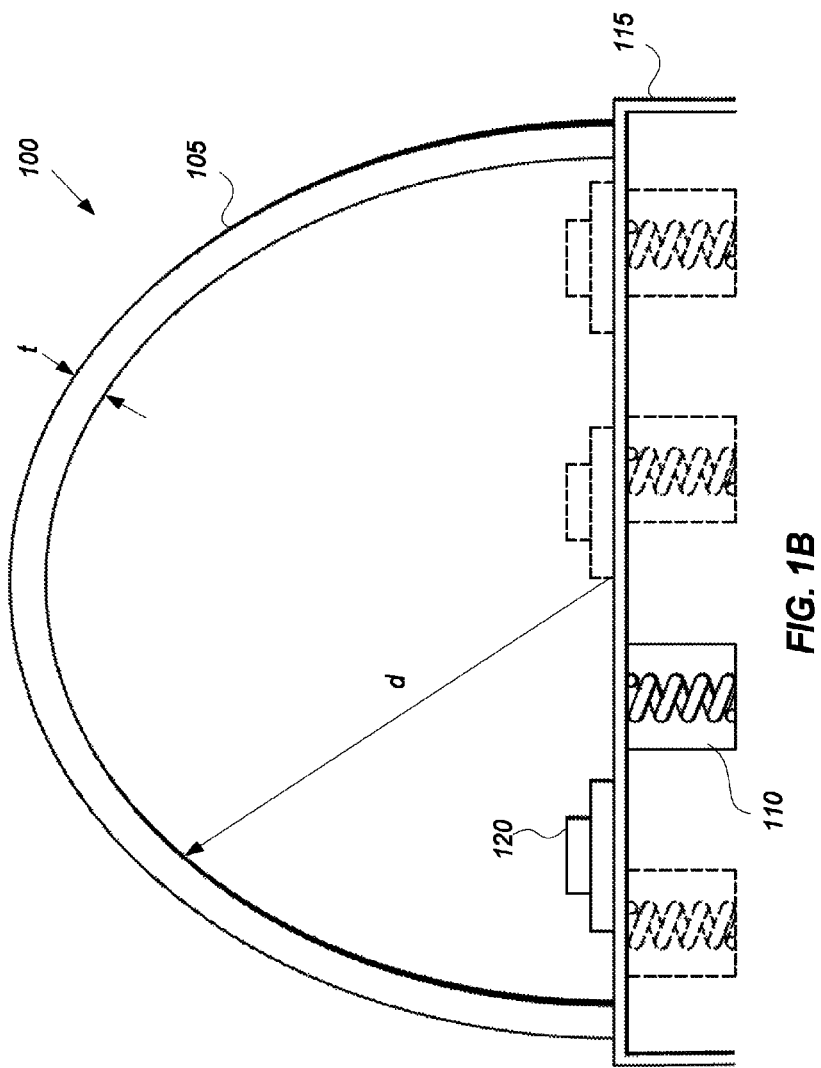
FIG. 1B illustrates an elevation view of the HMI device according to an exemplary embodiment of the present disclosure.

In one embodiment of the present disclosure, the dome 105 is hemispherical with diameter d and thickness t (shown in FIG. 1B). The size of the dome 105 can be limited due to the range of the cLIDAR 120, an amount of space available for installation of the HMI device 100, or the size of a human hand. In one embodiment of the present disclosure, the dome 105 is connected to the base 115 and the haptic device 110. Alternatively or in addition, the haptic device 110 can be connected only to the base 115.

The haptic device 110 can be any device including an actuator that provides a vibration or tactile feedback to a user of the HMI device 100. The actuator can be a piezoelectric type of actuator. Further, the haptic device may incorporate a pressure sensor to determine a pressure of an applied force while making a gesture. The haptic device 110 can be placed on the base 110, inside the dome 105, outside the dome 105 or a combination thereof. The haptic device 110 can be connected to the dome 105 to allow vibrations to pass to the dome 105, when the haptic device 110 is activated. The haptic device 110 can send and receive signal from the HMI controller 40. In one embodiment, one or more haptic devices can be installed in a seat, steering, head rest, door, etc. to provide haptic feedback.

The HMI controller 40 is a controller configured to send and receive signals from the cLIDAR 120 and the haptic device 110, to determine a gesture, and send a responsive signal to execute a command corresponding to a gesture. The HMI controller 40 can further control the haptic device 110 to activate the vibration or tactile type feedback. The feedback signal can be of different types such as a warning signal, a task complete signal, or an error signal. For example, when a command indicated by a gesture is executed, the HMI controller 40 can send a task complete feedback signal to activate the actuator for 1 second. In another example, when an error occurs while executing the command indicated by the gesture, the HMI controller 40 can send an error feedback signal to activate and deactivate the actuator for 0.5 seconds twice in succession.

Figure 2:
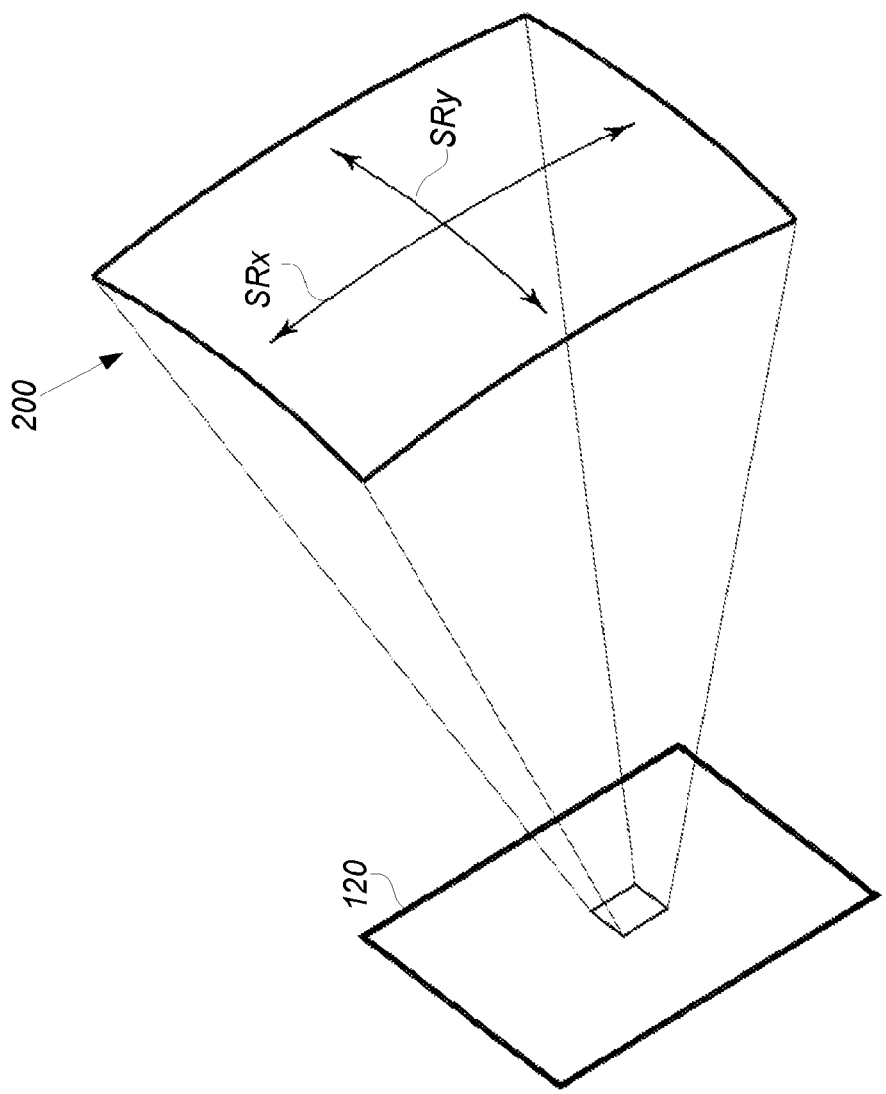
FIG. 2 illustrates a field-of-view of a chip scale LIDAR implemented in the HMI device according to an exemplary embodiment of the present disclosure.

FIG. 2 illustrates a field-of-view of the cLIDAR 120 according to an exemplary embodiment of the present disclosure. When the cLIDAR 120 is in a stationary state or not connected to the soft actuator 100, the cLIDAR 120 has a field-of-view 200 (FOV 200 hereinafter). The FOV 200 of the cLIDAR 120 can be defined as an envelope of an observable world that can be detected by the cLIDAR 120. The envelope can be conical or prismatic shaped. The FOV 200 has a scanning direction SD, and a scanning range SRx and SRy. As such the cLIDAR 120 has a two dimensional scanning capability. The FOV 200 is measured in a direction perpendicular to the plane of the cLIDAR 120.

The cLIDAR 120 can be attached to a soft actuator that can steer the cLIDAR 120 in certain directions increasing the field-of-view of the cLIDAR 120. The soft actuator is made of material such as rubber and includes piezoelectric pumps controlled by an actuation controller. The actuation controller activates or deactivates different steering modes of the soft actuator. As a result of steering, the FOV of the cLIDAR 120 can be an aggregation of the FOVs of the cLIDAR 120 obtained from activation of different steering modes of the soft actuator 100. Furthermore, in case of an array of cLIDAR 120 arranged adjacent to each other, an interference may be created; however, such interference does not diminish the capability of detecting an object located in an interfering portion.

Figure 3:
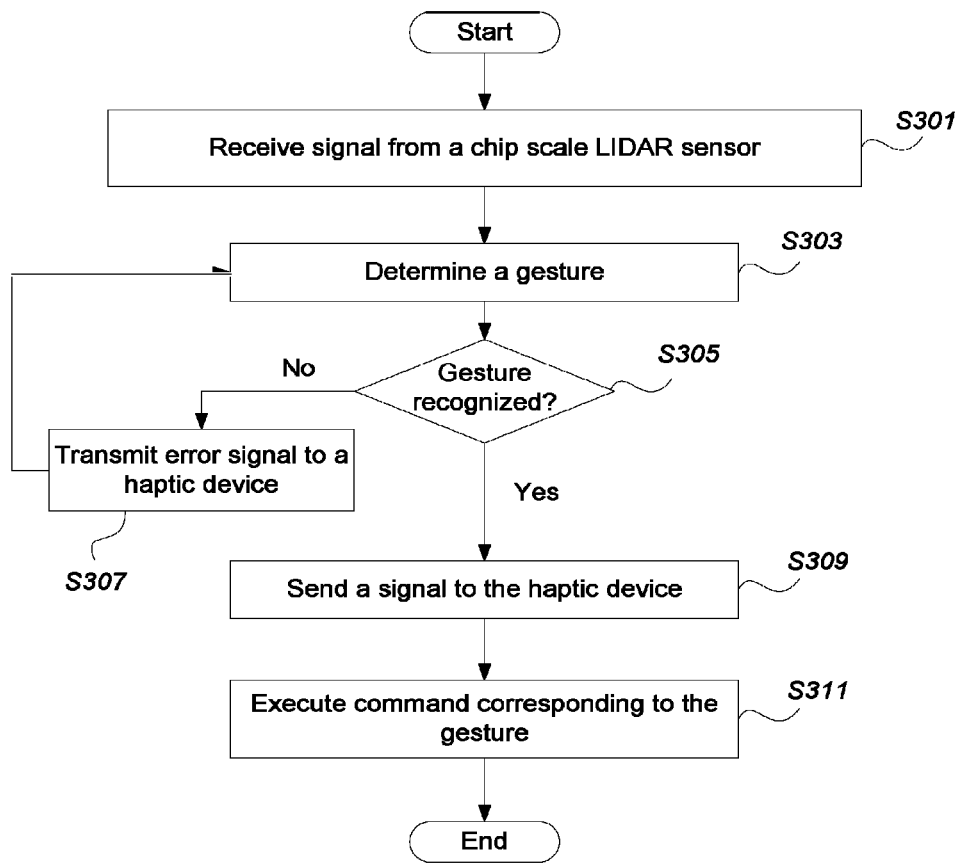
FIG. 3 is an exemplary flow chart of control logic executed on an HMI controller according to an exemplary embodiment of the present disclosure.

FIG. 3 flow chart of process implemented by the HMI controller 40 according to an exemplary embodiment of the present disclosure. The process detects a gesture and provides a haptic feedback. The HMI control process starts when a scanning request is activated, for example, by switching on a cLIDAR 120 or the HMI controller 40.

In step S301, the HMI controller 40 receives a signal from the cLIDAR 120. The signal captures gesture information which can be interpreted by the HMI controller 40. In step S303, the HMI controller 40 determines a gesture detected based on the signal from the cLIDAR 120. The gesture can be any motion corresponding to, for example, a tapping, a double tapping, a rotation, a scroll, zoom in, zoom out, etc. The HMI controller 40 can interpret the signal to identify the motion and compare the motion with different motions stored in a memory of the HMI controller 40 or a gesture database stored in a remote server. The comparison can involve executing a pattern recognition algorithm that can use the motion signal as input, and match the motion with the patterns of motion stored in the memory to determine the type of gesture. The patterns of motion can be predetermined and stored in the memory to execute specific commands.

In step S305, the HMI controller 40 determines whether a gesture is recognized. If a gesture is not recognized, then in step S307, the HMI controller 40 transmits an error feedback signal to the haptic device 110. For example, the error feedback signal could be in the form of vibrating the haptic device 110 two times for 0.5 seconds in succession, or vibrating the haptic device 110 for a longer duration such as 5 seconds. The error feedback signal can be felt by a user via the dome 105, as vibrations from the haptic device are transmitted to the dome 105.

When the gesture is recognized by the HMI controller 40, then in step S309, a recognition feedback signal (different from the error feedback signal) is transmitted to the haptic device 110. The recognition feedback signal can cause the haptic device 110 to vibrate in a particular manner indicating that the gesture is recognized. Further, in step S311, a command corresponding to the gesture can be executed. The command can be related to an external device such as a radio, A/C controller, cruise control, wiper control, etc. For instance, gestures can be related to increasing the volume of the radio, changing radio station, activating the cruise control, increasing or decreasing the speed of the wiper, etc. However, if an error occurs in executing the command, the HMI controller 40 can activate the error feedback signal. Such feedback alerts the user of an error and the user can choose to perform the task corresponding to the command in an alternative manner. For example, by manually increasing the speed of the wiper using a conventional wiper controller.

Figure 4:
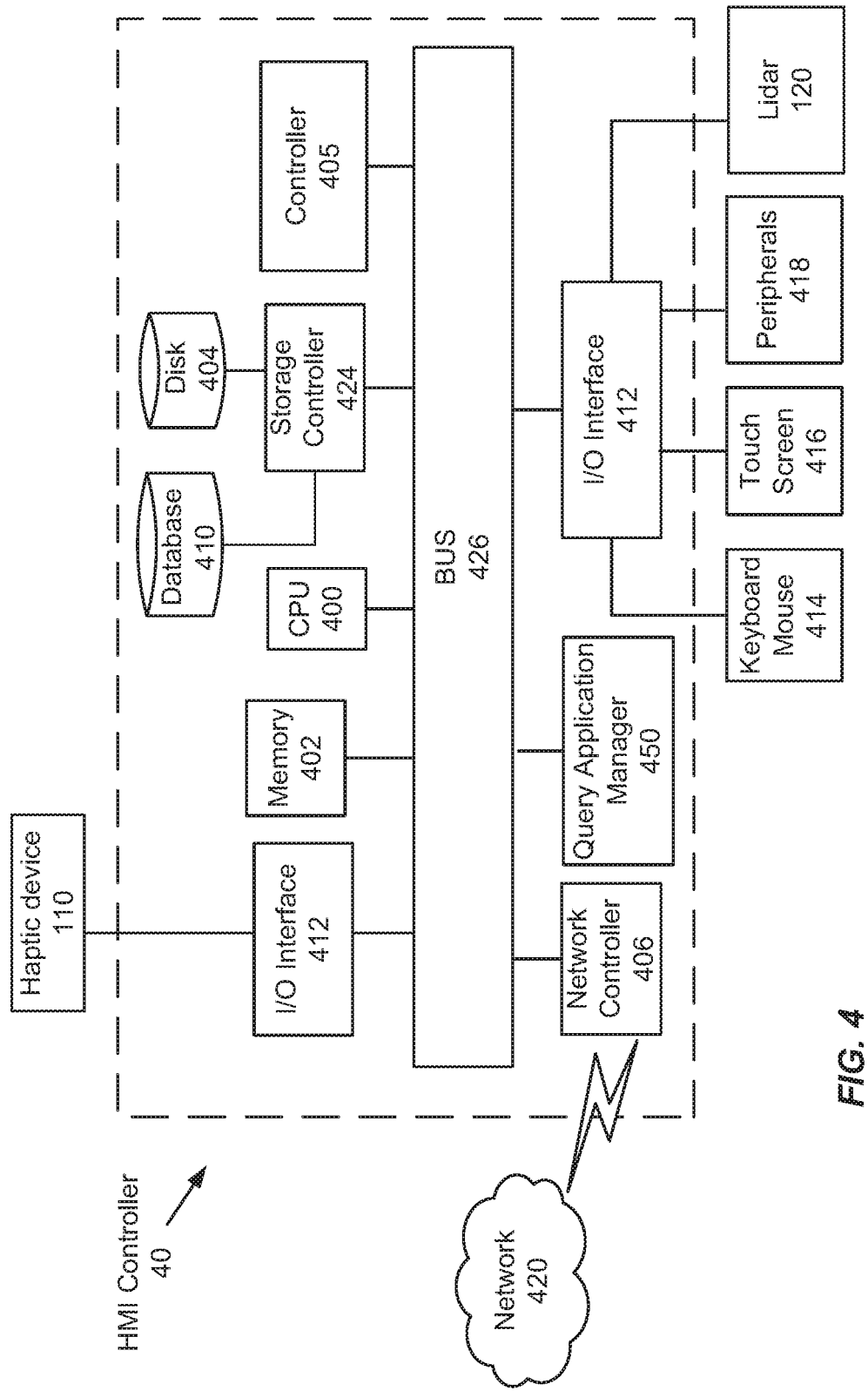
FIG. 4 is a detailed block diagram illustrating an exemplary HMI controller according to certain embodiments of the present disclosure.

FIG. 4 is a detailed block diagram illustrating an exemplary HMI controller 40 according to certain embodiments of the present disclosure. In FIG. 4, the HMI controller 40 includes a CPU 400 which can be configured to perform the processes described in the present disclosure with respect to FIGS. 1A and 3. The process data and instructions may be stored in a memory 402. These processes, instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the HMI controller 40 communicates, such as a server or computer.

Further, the claimed advancements may be provided as a utility application, background daemon, or component of an operating system, or combination thereof, executing in conjunction with CPU 400 and an operating system such as Microsoft Windows 10, UNIX, Solaris, LINUX, Apple MAC-OS and other systems known to those skilled in the art.

The hardware elements, in order to achieve the HMI controller 40, may be realized by various circuitry elements, known to those skilled in the art. For example, CPU 400 may be a XENON or Core processor from INTEL of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above with respect to FIGS. 1A and 3.

The HMI controller 40, in FIG. 4, also includes a network controller 406, such as an INTEL Ethernet PRO network interface card from Intel Corporation of America, for interfacing with a network 420. As can be appreciated, the network 420 can be a public network, such as the Internet, or a private network such as an LAN or WAN network, or any combination thereof and can also include PSTN or ISDN sub-networks. The network 420 can also be wired, such as an Ethernet network, or can be wireless such as a cellular network including EDGE, 3G and 4G wireless cellular systems. The wireless network can also be WiFi, BLUETOOTH, or any other wireless form of communication that is known. The HMI controller 40 can communicate with external devices such as the radio, A/c, wiper controller, etc. of an automotive via the network controller 406.

Furthermore, the HMI controller 40, via the network controller 406 can communicate with the haptic device 110 and the cLIDAR 120.

An I/O interface 412 interfaces with a keyboard and/or mouse 414 as well as a touch screen panel 416 on or separate from a display of a user device. Further, the HMI controller 40 can be connected to a user device such as a smartphone, laptop, touchpad, etc. via the I/O interface 412 or through the network 420. The user device can send queries that are handled by a query application manager 450 including extracting data from the disk 404 or a database 410 via the storage controller 424, from the memory 402, or trigger execution of processes discussed in FIGS. 1A and 3.

The controller 405 can be used to implement optimization algorithms and may include one or more CPUs, and may control each element in the user device to perform functions related to communication control, audio signal processing, control for the audio signal processing, still and moving image processing and control, and other kinds of signal processing. The controller 405 may perform these functions by executing instructions stored in a memory 402, for example, the processes illustrated in FIG. 3.

The storage controller 424 connects the storage medium disk 404 or the database 410 with communication bus 426, which may be an ISA, EISA, VESA, PCI, or similar device, for interconnecting all of the components of the HMI controller 40. A description of the general features and functionality of the keyboard and/or mouse 414, as well as the storage controller 424, network controller 406, and the I/O interface 412 is omitted herein for brevity as these features are known.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. A human machine interface (HMI) device, comprising:
   a dome;
   a base attached to the dome forming an inverted cup like structure with a hollow interior;
   a chip scale lidar attached on the base and positioned to scan for a motion of an object external to the dome;
   at least one haptic device attached to the base and connected to the dome; and
   an HMI controller configured to communicate with the chip scale lidar, detect and recognize a gesture detected by the chip scale lidar, and activate or deactivate the at least one haptic device.

2. The device according to claim 1, wherein the dome has a hemispherical shape and is made of transparent material that prevents light scattering.

3. The device according to claim 2, wherein a size of the dome is limited by at least one of the range of the chip scale lidar, and a pre-determined maximum allowable distance of an object from the dome.

4. The device according to claim 1, wherein the chip scale lidar is enclosed by the dome and positioned on the base in at least one location selected from a center of the dome, off center of the dome, and at a periphery of the dome.

5. The device according to claim 1, wherein the chip scale lidar is installed on a soft actuator to steer the chip scale lidar in different directions increasing a field-of-view of the chip scale lidar.

6. The device according to claim 1, further comprising at least one additional chip scale lidar wherein the plurality of the chip scale lidars is installed in an array.

7. The device according to claim 1, wherein the at least one haptic device is installed below the base.

8. The device according to claim 1, wherein the HMI controller is further configured to send a feedback signal to the haptic device communicating to a user:
   a success indicator related to execution of a command corresponding to the gesture,
   a warning related to the execution of the command, or
   an error related to execution of the command.

9. The device according to claim 1, further comprising:
   a gesture database wherein the HMI controller recognizes the gesture by comparing and matching a motion of the gesture with a plurality of motions stored in a gesture database of the HMI device.

10. A method for providing haptic feedback for a HMI device, the method comprising:
    receiving, using processing circuitry, a signal from a chip scale lidar sensor;
    determining, using the processing circuitry, a gesture based on the signal from the chip scale lidar sensor;
    determining, using the processing circuitry, whether the gesture is recognized;
    transmitting, via a network, a signal to the haptic device; and
    executing a command corresponding to the gesture.

11. The method according claim 10, further comprising:
    sending a feedback signal to the haptic device communicating to a user a success indicator related to execution of a command corresponding to the gesture, a warning related to the execution of the command, or an error related to execution of the command.

12. The method according claim 10, wherein the gesture is recognized by comparing and matching, using the processing circuitry, a motion of the gesture with a plurality of motions stored in a gesture database of the HMI device.

* * * * *